United States Patent
Nociolo et al.

(10) Patent No.: US 9,031,241 B2
(45) Date of Patent: May 12, 2015

(54) LINK AND PHYSICAL CODING SUB-LAYER PROTOCOLS

(75) Inventors: Larry Nociolo, Fair Haven, NJ (US); Brian Patrick Towles, New York, NY (US)

(73) Assignee: D.E. Shaw Research, LLC, New York, NY (US)

( * ) Notice: Subject to any disclaimer, the term of this patent is extended or adjusted under 35 U.S.C. 154(b) by 817 days.

(21) Appl. No.: 12/699,959

(22) Filed: Feb. 4, 2010

(65) Prior Publication Data

US 2010/0195835 A1    Aug. 5, 2010

Related U.S. Application Data

(60) Provisional application No. 61/150,191, filed on Feb. 5, 2009.

(51) Int. Cl.
| | |
|---|---|
| *H04B 1/7073* | (2011.01) |
| *G06F 13/40* | (2006.01) |
| *H04L 7/00* | (2006.01) |

(52) U.S. Cl.
CPC .............. *G06F 13/4022* (2013.01); *H04L 7/00* (2013.01)

(58) Field of Classification Search
USPC ............................................................ 380/5
See application file for complete search history.

(56) References Cited

U.S. PATENT DOCUMENTS

| | | | | |
|---|---|---|---|---|
| 3,825,832 A | * | 7/1974 | Frei et al. ................. | 375/240.14 |
| 4,674,064 A | * | 6/1987 | Vaughn ........................... | 710/71 |
| 4,796,282 A | * | 1/1989 | Yoshida ......................... | 375/368 |
| 4,891,808 A | * | 1/1990 | Williams ....................... | 370/503 |
| 5,084,891 A | * | 1/1992 | Ariyavisitakul et al. ..... | 714/775 |
| 5,170,131 A | * | 12/1992 | Takahiro et al. .............. | 329/300 |
| 5,483,518 A | * | 1/1996 | Whetsel ......................... | 370/241 |
| 5,590,161 A | * | 12/1996 | Meyn et al. .................... | 375/368 |
| 5,801,649 A | * | 9/1998 | Fredrickson ................... | 341/58 |
| 6,025,758 A | * | 2/2000 | Lu ................................. | 332/100 |
| 6,081,570 A | * | 6/2000 | Ghuman et al. .............. | 375/368 |
| RE36,919 E | * | 10/2000 | Park .............................. | 380/203 |
| 6,539,051 B1 | * | 3/2003 | Grivna ......................... | 375/219 |
| 7,023,997 B1 | * | 4/2006 | Schier .......................... | 380/277 |
| 7,975,082 B2 | * | 7/2011 | Chiu et al. ...................... | 710/52 |
| 2002/0186802 A1 | * | 12/2002 | Morgan et al. ............... | 375/355 |
| 2002/0191533 A1 | * | 12/2002 | Chini et al. ................... | 370/206 |
| 2004/0177251 A1 | * | 9/2004 | Hayashi ........................ | 713/161 |

(Continued)

FOREIGN PATENT DOCUMENTS

WO  WO 2008/059588   * 11/2006  .............. H03M 7/46

OTHER PUBLICATIONS

PCI-SIG's PCI Express 3.0 FAQ's about the standard under development (128B/130B coding): Sep. 15, 2007, www.pcisig.com/news_room/faqs/PCIe_3_0_External_FAQ_Nereus.pdf [retrieved from website: Aug. 20, 2010].

(Continued)

*Primary Examiner* — Andrew Goldberg
(74) *Attorney, Agent, or Firm* — Occhiuti & Rohlicek LLP

(57) ABSTRACT

An approach to data communication makes use of a protocol for encoding data on a serial link that provides both a run length limiting function and a frame marking function, while minimizing communication overhead over the data bearing portions of the signal, and while limiting latency introduced into the communication. In some examples, a single bit is added as a frame marker in such a way that a single bit frame marker also limits run length.

22 Claims, 13 Drawing Sheets

(56) References Cited

U.S. PATENT DOCUMENTS

| | | | | |
|---|---|---|---|---|
| 2005/0047334 | A1* | 3/2005 | Paul et al. | 370/229 |
| 2005/0123061 | A1* | 6/2005 | Smith et al. | 375/261 |
| 2006/0101184 | A1* | 5/2006 | Hegarty | 710/307 |
| 2007/0081730 | A1* | 4/2007 | Arakawa et al. | 382/232 |
| 2008/0232509 | A1* | 9/2008 | Jonsson et al. | 375/296 |
| 2009/0276683 | A1* | 11/2009 | Toyoda et al. | 714/752 |
| 2010/0075615 | A1* | 3/2010 | Ma | 455/73 |
| 2010/0182830 | A1* | 7/2010 | Ryu et al. | 365/185.2 |
| 2012/0051419 | A1* | 3/2012 | Katsumata | 375/240.01 |

OTHER PUBLICATIONS

PCIe Technology Seminar, "PCIe 3.0 PHY Electrical Layer Requirements" Feb. 2008, http://www.pcisig.com/developers/main/training_materials/ [retrieved from website: Aug. 20, 2010].

PCIe Technology Seminar, "PCIe 3.0 PHY Logical Layer Requirements" http://www.pcisig.com/developers/main/training_materials/ Feb. 2008, [retrieved from website: Aug. 20, 2010].

PCIe Technology Seminar, PCIe 3.0 PHY Electrical Layer Requirements: Apr. 2008, http://www.pcisig.com/developers/main/training_materials/ [retrieved from website: Aug. 20, 2010].

PCIe Technology Seminar, "PCIe 3.0 PHY Logical Layer Requirements" http://www.pcisig.com/developers/main/training_materials/ Apr. 2008, [retrieved from website: Aug. 2010].

PCI-SIG Developer's Conference 2008, "PCIe 3.0 PHY Electricals Part I&II" Jun. 2008, http://www.pcisig.com/developers/main/training_materials/ [retrieved from website: Aug. 20, 2010].

PCI-SIG Developer's Conference 2008, "PCIe 3.0 PHY Electricals Part III" Jun. 2008, http://www.pcisig.com/developers/main/training_materials/ [retrieved from website: Aug. 20, 2010].

PCI-SIG Developer's Conference 2008, "5 GT/s and 8 GT/s Compared" Jun. 2008, http://www.pcisig.com/developers/main/training_materials/ [retrieved from website: Aug. 20, 2010].

10 Gb/s Ethernet over backplane, IEEE 802.3-2008 10Gbase-KR, clause 49 (64B/66B coding): http://standards.ieee.org/getieee802/802.3.html [retrieved from website: Aug. 20, 2010].

Application note from Maxim Technologies, "NRZ Bandwidth—LF Cutoff and Baselinz Wander": Apr. 2008, http://www.maxim-ic.com/app-notes/index.mvp/id/1738 [retrieved from website: Aug. 20, 2010].

Original 8B/10B code paper from Widmer and Franaszek at IBM: 1983, http://domino.research.ibm.com/tchjr/journalindex.nsf/0/b4e28be4a69a153585256bfa0067f59a?OpenDocument [retrieved from website: Aug. 20, 2010].

Gigabit Ethernet standard, IEEE 802.3-2008 1000base-X clause 36 (8B/10B coding) http://standards.ieee.org/getieee802/802.3.html [retrieved from website: Aug. 20, 2010].

* cited by examiner

LINK AND PHYSICAL CODING SUB-LAYER PROTOCOLS

RELATED APPLICATIONS

Under 35 USC 119, this application claims the benefit of the priority date of U.S. Provisional application 61/150,191, filed on Feb. 5, 2009, the contents of which are herein incorporated by reference.

FIELD OF DISCLOSURE

This disclosure relates to a data communication, and in particular, to protocols for use at link and physical coding sub-layers.

BACKGROUND

In many communication systems, binary data is communicated between transmitters and receivers in a serial manner, one bit at a time over a communication link, for example, over an electrical line.

In some systems, the method for transmitting data over the serial link requires that there be a limit on the number of consecutive equal values (e.g., runs of zero or runs of one).

In some systems, the serial data is divided into sections, often referred to as frames, and the signal transmitted on the link includes markers identifying or separating the frames.

SUMMARY

In one aspect, an approach to data communication makes use of a protocol for encoding data on a serial link that provides both a run-length limiting function and a frame marking function, while minimizing communication overhead over the data bearing portions of the signal, and while limiting latency introduced into the communication. In some examples, a single bit is added as a frame marker in such a way that single bit frame marker also limits the run length.

In another aspect, an approach to communication of a series of fixed-length data frames involves separating the frames into portions that are sent over separate serial data streams, with each serial data stream making use of frame markers that both identify frames in the stream and that limit the run length of like bit values.

In another aspect, a method for communicating binary data includes, at a sending node, for each of a series of n-bit data units, serially communicating the n-bit data unit to a receiving node. Communicating the bits includes deterministically scrambling the n bits of the accepted sequence of bits, generating an m bit frame marker based on a subset of the scrambled bits, forming a data frame by grouping the frame marker and the scrambled bits, and serially transmitting the data frame to the receiving node. The method also includes, at the receiving node, forming data frames from received bits according to the frame markers in the serially transmitted data. For each formed data frame, the scrambled bits are recovered, and the recovered bits are descrambled to obtain the n-bit data unit.

Among the practices of the invention are those in which generating the m-bit frame marker includes generating a one-bit frame marker, or generating the frame marker based on m or fewer of the scrambled bits, or generating a one-bit frame marker by inverting, or taking the complement of, a predetermined one of the scrambled bits.

In other practices, n is a number of bits in a range between 39 and 79, inclusive.

In yet other practices, deterministically scrambling the n bits includes applying an invertible transformation of the n bits such that the scrambled bits have a statistically equal number of one and zero bits.

Additional practices of the invention include those in which the formed data frames have statistically equal numbers of one and zero bits, and those in which the formed data frames have a power spectral density substantially equivalent to a power spectral density of random data.

In some practices, the m-bit frame markers are generated such that a maximum run length of equal bit values in the serially transmitted frames is less than or equal to n+m.

Additional practices include transmitting a training data pattern from the sending node to the receiving node, and detecting frame timing at the receiving node according to the received training data pattern. Transmission of training data can be initiated by detecting the frame timing when the received frame markers received in the serially transmitted data do not match expected frame markers.

Other practices include those in which forming data frames from received bits according to the frame markers in the serially transmitted data includes using the detected frame timing, and forming data frames by comparing received frame markers in the serially transmitted data with expected frame markers based on the detected frame timing.

Additional practices include, at the sending node, receiving the n-bit data units at a physical coding sub-layer interface.

Other practices include, at the sending node, for each of a series of (L·n)-bit data units, forming L separate n-bit data units, and for each of the n-bit data units, deterministically scrambling the n-bits of the accepted sequence of bits, generating an m-bit frame marker based on a subset of the scrambled bits, forming a data frame by grouping the frame marker and the scrambled bits, and serially communicating each of the L frames thus formed over a corresponding different serial communication link to the receiving node, and at the receiving node, for each of the different serial communication links, forming data frames from received bits according to the frame markers of frames transmitted on the serial communication link; and processing a formed frame from each of the serial communication links to form one of the (L·n)-bit data units.

In another aspect, a communication system includes a sending node and a receiving node. The sending node includes an input section configured to receive a sequence of n-bit data units; a deterministic scrambler coupled to the input section and configured to accept an n-bit data unit from the input section and to produce a scrambled n-bit output; a frame labeler configured to generate an m-bit frame marker based on a subset of a scrambled n-bit output from the deterministic scrambler; and an output section configured to provide, to a serializer, a data frame formed by the frame marker and the scrambled bits. The receiving node includes an input section configured to receive data frames from a deserializer; a frame detector coupled to the input section and configured to detect frames based on frame markers in the data frames from the deserializer; a framer coupled to the deserializer and configured to form n-bit outputs; a descrambler coupled to the framer for descrambling an n-bit data unit from the output of the frame; and an output section configured to providing a sequence of n-bit data units.

Other aspects of the invention include computer-readable media having encoded thereon software intended to be tied to or otherwise linked or tethered to a physical data processing system by causing execution of any of the foregoing methods on the data processing system. The data processing system to which the software is to be tied is a tangible system that consumes electrical energy and generates waste heat in the process of carrying out processing steps. The processing steps result in transformation of recording media as electrical signals are communicated between portions of the data processing system.

The link and physical coding sub-layer protocols described herein are for low-latency high-bandwidth interconnects, or channels, using standard signaling and serializer-deserializer circuits. These protocols are not limited to electrical signaling, and may be readily adapted to other communication systems.

By using the frame marker both for identification of frames in a serial data stream and for limiting run lengths, fewer overhead bits are introduced into the data stream, thereby increasing the effective data rate of the stream. In addition, by forming a data stream that conforms to the run-length constraints of standard protocols, one permits the use of standard serializer/deserializer circuits even while using a non-standard link and physical coding sub-layer protocol.

Other features and advantages of the invention are apparent from claims, the following description, and the accompanying figures, in which:

DETAILED DESCRIPTION

In the field of computational biochemistry, it is often useful to simulate molecular dynamics of proteins and other biological macromolecules. Such simulations have applications in the fields of structural biology, biochemistry, and drug design and screening. The computational burden of such simulations reveal performance limitations in existing computer systems.

Figure 1:
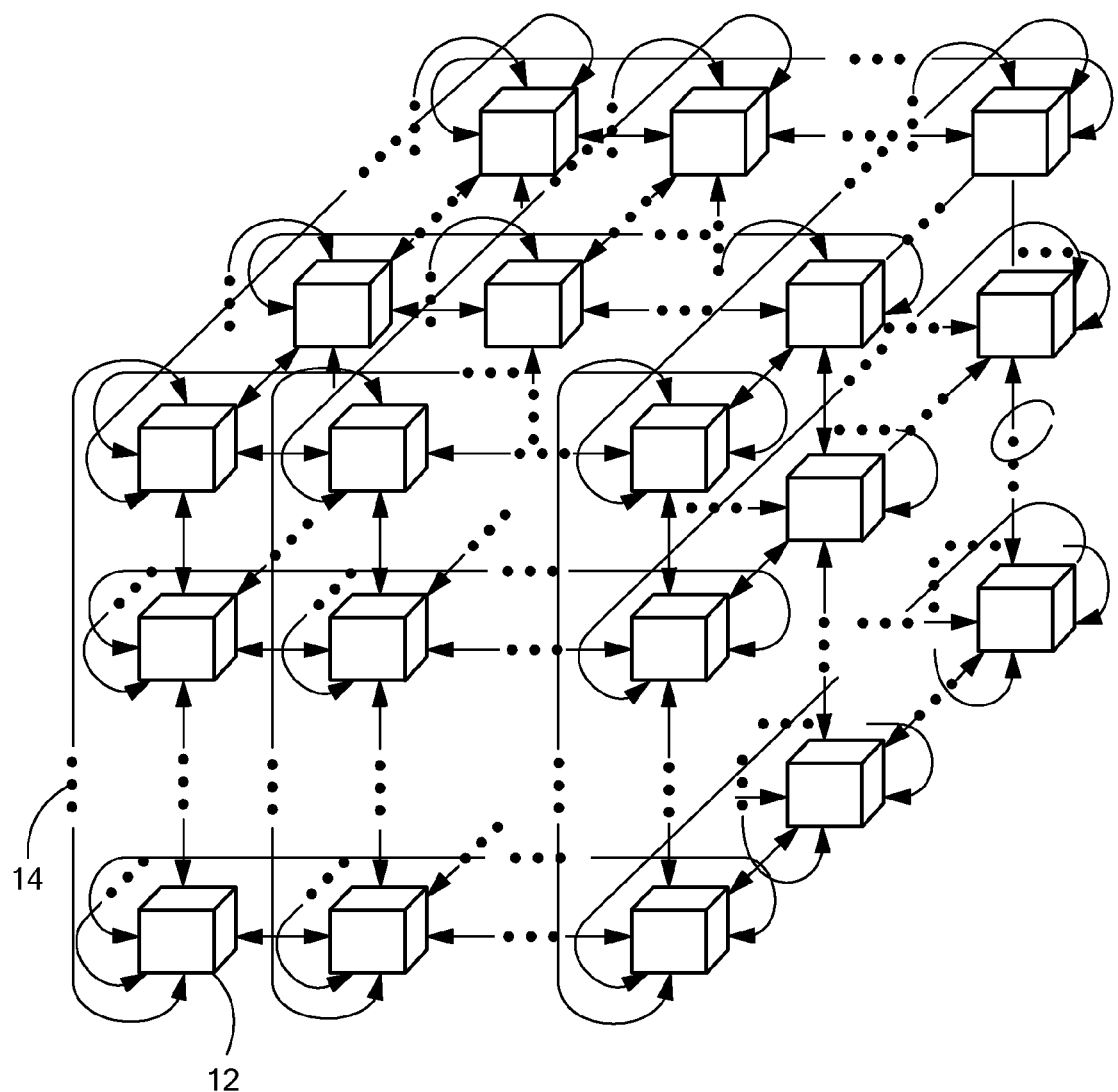
FIG. 1 shows processing nodes interconnected in a torus network.

One can often enhance performance by providing a set of cooperating processors, called nodes 12, as shown in FIG. 1. These nodes 12 send messages to each other on channels 14. The particular configuration of nodes 12 and channels 14 shown in FIG. 1, is often referred to as a "torus network." A node sending a message will be referred to as a "sending node," and a node receiving a message will be referred to as a "receiving node." The same physical node can function as both a sending node and a receiving node.

The configuration shown in FIG. 1 improves performance by dividing computational tasks among different processing nodes 12. However, the performance can be further improved by enhancing the speed at which processing nodes 12 send each other messages on the channels 14.

Ideally, the channels 14 connecting the processing nodes 12 have high bandwidth and low latency. In this context, "bandwidth" is measured by the product of a channel's bit rate and its payload utilization; and "latency" is measured by the "hop time." Hop time refers to the time it takes a packet to transit a node 12, which includes the sum of delays associated with transmitting and receiving the packet.

Figure 2:
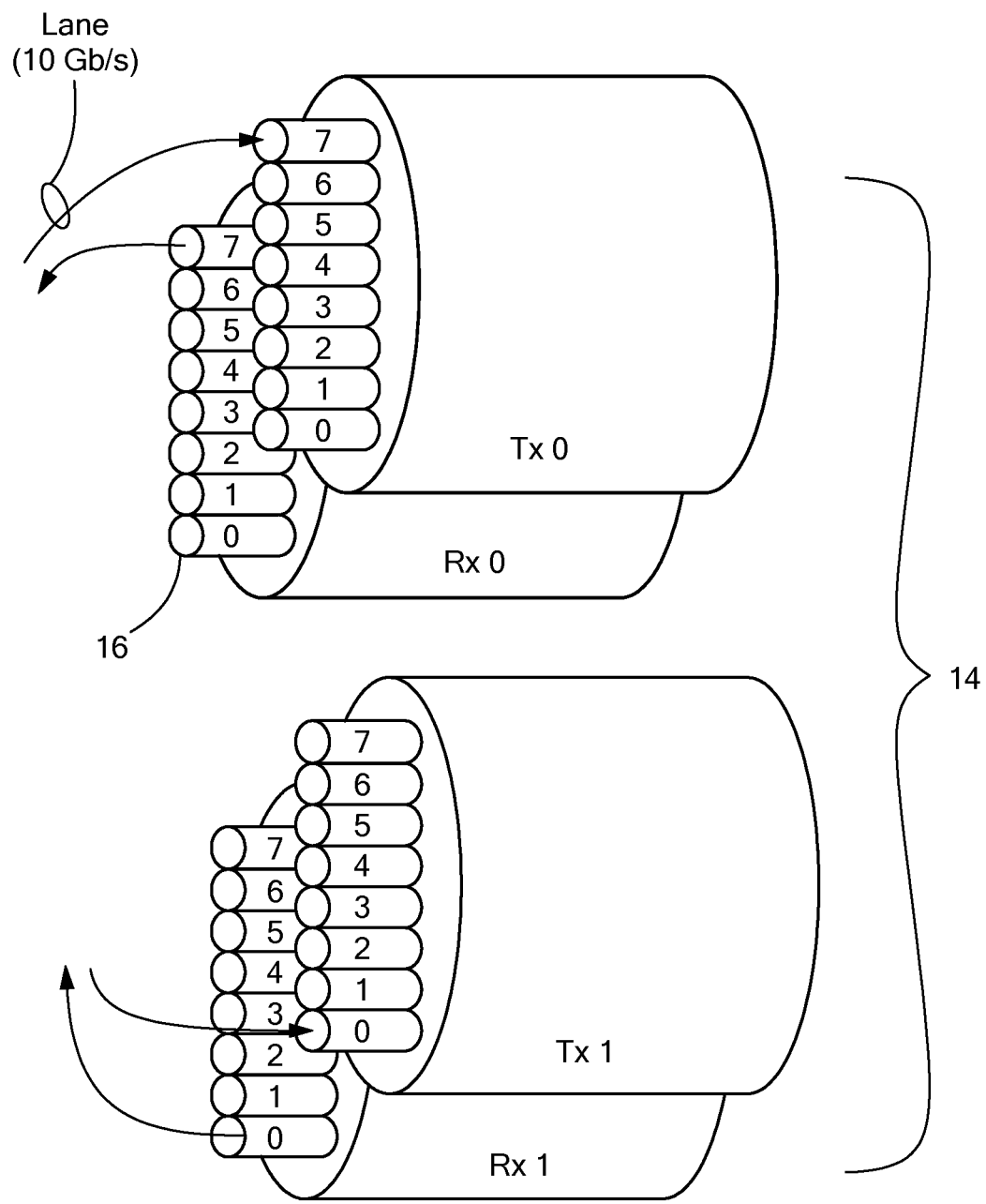
FIG. 2 shows a typical channel between a pair of nodes in FIG. 1.

A typical channel 14 shown in FIG. 2, uses a plurality of physical lanes 16 between sending and receiving nodes 12. A layered communication protocol stack passes packets between sending and receiving nodes 12, as shown in FIG. 3.

Figure 3:
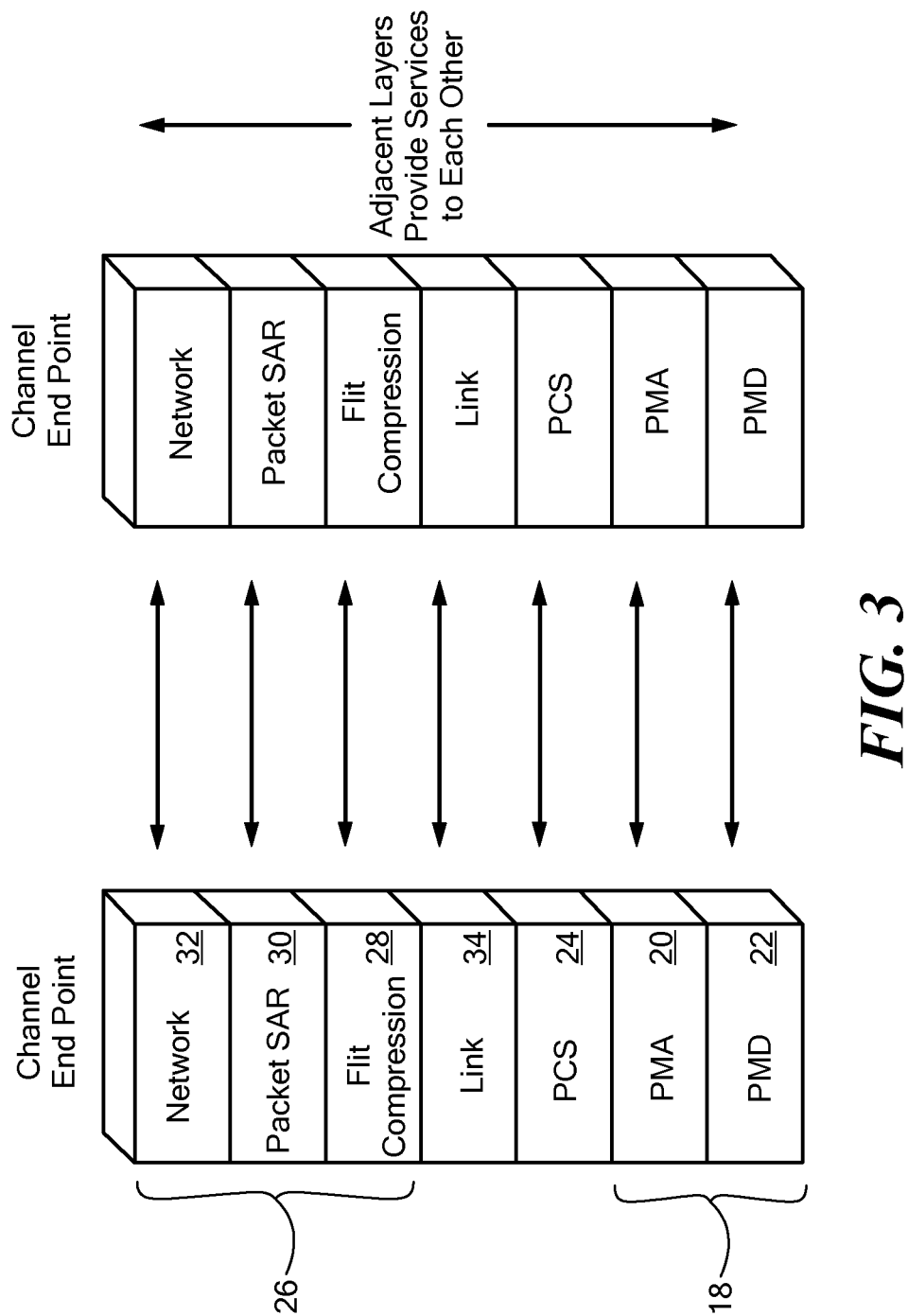
FIG. 3 shows a protocol stack for communication on the channel shown in FIG. 2.

The lower protocol layers in FIG. 3 include a physical layer circuit 18 having a physical media dependent layer 22 and a physical media adaptation layer 24. These layers define individual physical lanes 16, adjust electrical signaling, and perform serialization/de-serialization functions. A physical coding sub-layer 24 provides features that are used in connection with serialization and de-serialization.

The higher layers of the protocol stack in FIG. 3 aggregate and align the physical lanes 16 into a channel 14, implement procedures intended to achieve error-free transmission, indicate far-end packet buffer availability, among other functions. These higher layers include a client adapter 26 that carries out Flit compression 28, packet segmentation and re-assembly 30, as well as a network layer 32. In between these higher layers and lower layers is a channel link 34.

The physical coding sub-layer 24 achieves low-latency in part by connecting to an industry-standard 10-bit wide serializer/deserializer interface. In addition, the physical coding sub-layer 24 supports certain features for achieving both 10 Gb/s electrical signaling, and compatibility with industry-standard serializer/deserializer circuits.

At 10 Gb/s, the frequency spectrum of an electrical signal develops significant high frequency components. Unfortunately, the physical properties of a communication channel may not affect all frequencies in the same way. For example, skin-effect losses and dielectric losses typically increase with frequency. As a result, the different frequency components of an electrical signal propagate differently. This results in signal degradation.

In principle, if one knew in advance how the communication channel would affect an electrical signal, i.e. its frequency response, one could compensate by selectively amplifying or attenuating particular frequency components. This function is carried out by equalizer circuits, whose function is to flatten the frequency response of a communication channel by amplifying those frequency components that are known to be attenuated in transmission. However, it is not always possible to know the frequency response of a communication channel. In practice, the frequency response can vary widely with printed-circuit board (PCB) trace geometries, the specific choices of dielectric materials, and the construction of the circuit.

In an effort to compensate for such variations, a serializer/deserializer circuit carries out numerous functions that do not depend on a priori knowledge of the communication channel's electrical properties. These functions include automatic gain control, adaptive linear equalization, and adaptive equalization based on feedback provided by a decision feedback equalizer circuit.

In a typical data communication system, the serializer/deserializer circuit is responsible for physical media dependent and physical media adaptation protocols. In principle, such protocols should be independent of higher layer protocols. However, in practice, the design of a serializer/deserializer circuit is intimately tied to the higher level protocols. For example, the serializer/deserializer circuit makes certain assumptions about power spectral density, run length, and DC balance. One such assumption is that the value of an incoming bit is a random variable having an assumed probability distribution, typically the uniform distribution.

Among the functions of a serializer/deserializer circuit is that of maintaining synchronization with a clock. In doing so, the serializer/deserializer circuit relies in part on transitions between one bit and the next. If by chance an incoming bit stream were to include a lengthy run of bits without any transitions from one state to another, for example a long run of zero-bits uninterrupted by any one-bits, the serializer/deserializer circuit could face some difficulty in avoiding clock drift.

In an effort to maintain synchrony, as well as to compensate for electrical characteristics of the physical circuit, the sending node will occasionally transmit an agreed-upon training data pattern to the receiving node. The receiving node would then detect frame timing according the received data pattern. The frame timing information detected by the receiving node can be used to organize the received bits into data frames. The receiving node can carry out this procedure by, for example, comparing received frame markers with expected frame markers, with the expectation arising from the detected frame timing information. The sending node typically initiates this procedure when it learns that synchrony has been or is in danger of being lost. This might occur, for example, when a receiving node apprises the sending node that received frame markers are no longer matching expected frame markers.

Another function of the serializer/deserializer circuit is maintain a relatively constant voltage level at its output. Again, a lengthy run of bits without any transitions will often cause the output voltage to drift up or down.

To reduce the likelihood that the serializer/deserializer circuit will experience any of the foregoing difficulties, the physical coding sub-layer 24 processes an incoming bit stream so that the bit stream ultimately provided to the serializer/deserializer circuit: (1) is a DC balanced bit stream having a maximum run-length guarantee; and (2) has a power-spectral density close to a sync function in the frequency domain to match the power-spectral density of random data.

By toggling only one framing bit once every 40 or 80 bits, the physical coding sub-layer 24 increases payload utilization of the channel 14 and thus achieves high bandwidth. By providing a narrow width interface to upper layers of the protocol stack (e.g. 10 or 20 bits), the physical coding sub-layer 24 maintains phase and frequency synchronization with upper layers, thus allowing single stage PHY and channel framing.

As noted above, the serializer/deserializer circuit assumes that an incoming bit stream is random (i.e. the value of each incoming bit is a uniformly distributed random variable). Since the power-spectral density of such an incoming bit stream is a sync function in the frequency domain, the physical coding sub-layer 24 attempts to provide the serializer/deserializer circuit with a bit stream whose power-spectral density approximates that of a sync function.

In practice, the extent to which bits received by the serializer/deserializer circuit are truly random depends on how the physical coding sub-layer 24 layer encodes the bits. FIGS. 4-8 show power-spectral densities associated with various encoding schemes. As will be apparent from inspection of these figures, the power-spectral density of a 39b40b (40 bit frame with 39 payload bits and one framing bit) code is somewhat closer to being random, i.e. more closely approximates a sync function, than is the power-spectral density of 64b66b (66 bit frame with 64 payload bits and 2 framing bits) code.

Except as noted, in FIGS. 4-8, a fixed all zero's data pattern was used before encoding, and to avoid aliasing, each code was over sampled 4× and plotted with a frequency axis limited to the Nyquist sampling frequency. In addition, Bartlett's algorithm averaged 300 of 800 FFTs to reduce sampling noise.

Figure 4:
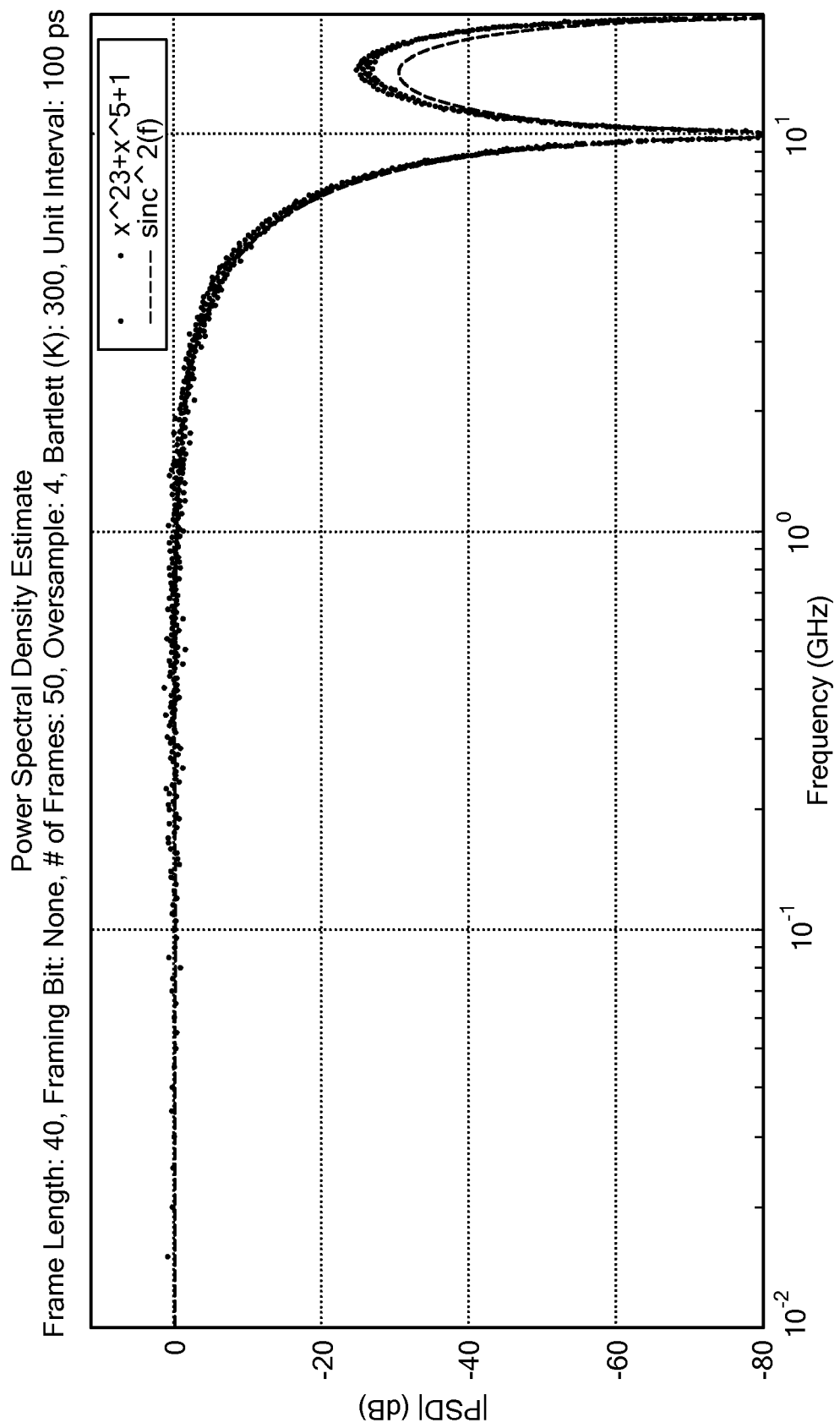
FIGS. 4-10 show power-spectral density functions associated with various encoding schemes.

FIG. 4 shows for comparison random data generated by a pseudo-random bit sequence based on the polynomial "X^23+X^5+1" and a sync function. Amplitudes have been scaled to allow comparison along the vertical axis. It is apparent from FIG. 4 that the polynomial based pseudo-random bit sequence closely matches the sync function.

Figure 5:
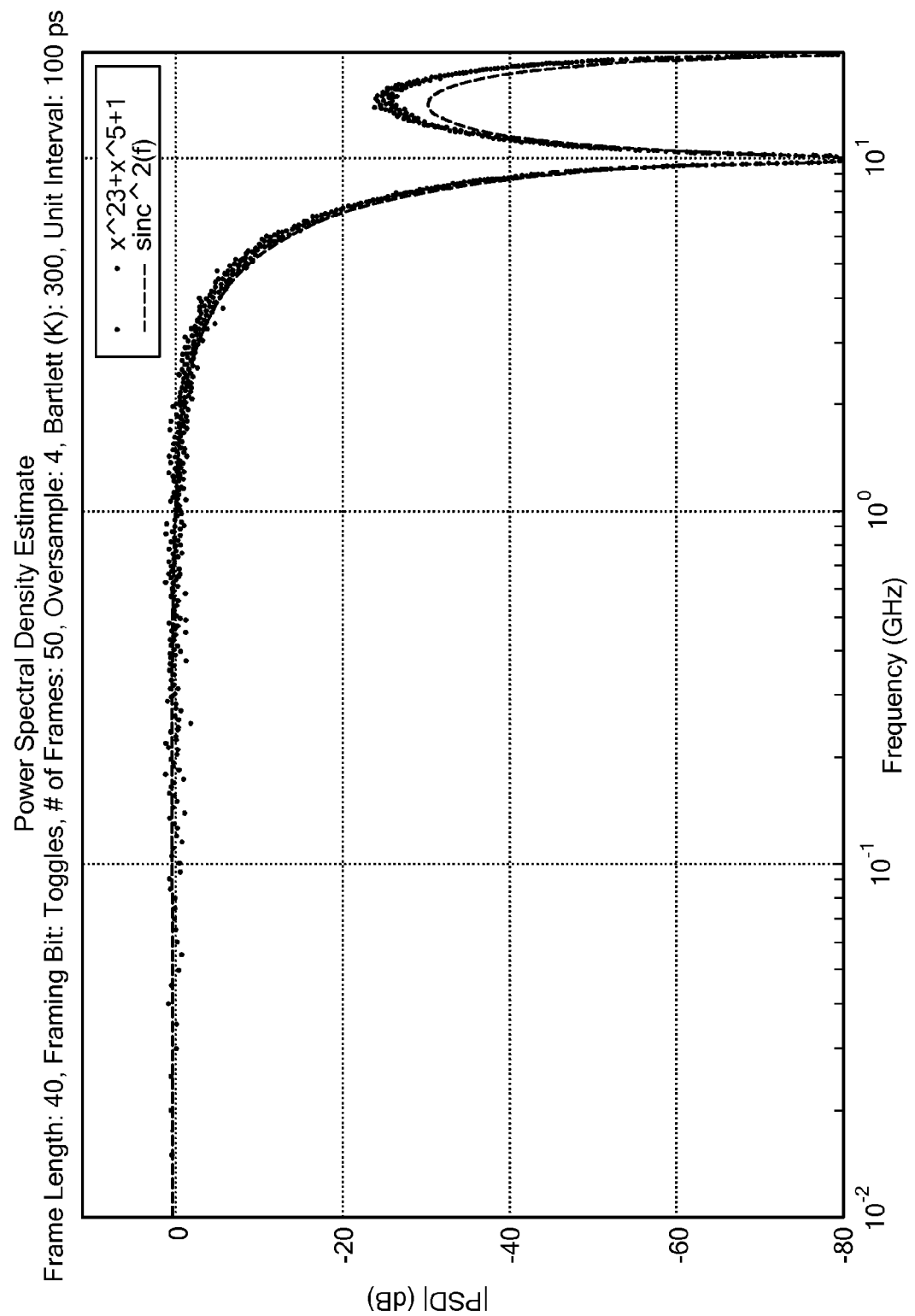

FIG. 5 shows the effect of an encoding scheme in which the bit stream is divided into 40-bit frames with a 39-bit scrambled payload and 1 unscrambled framing bit (39b40b). It is apparent that this encoding scheme results in a power-spectral density that is nearly identical to that of the pseudo-random bit sequence.

Figure 6:
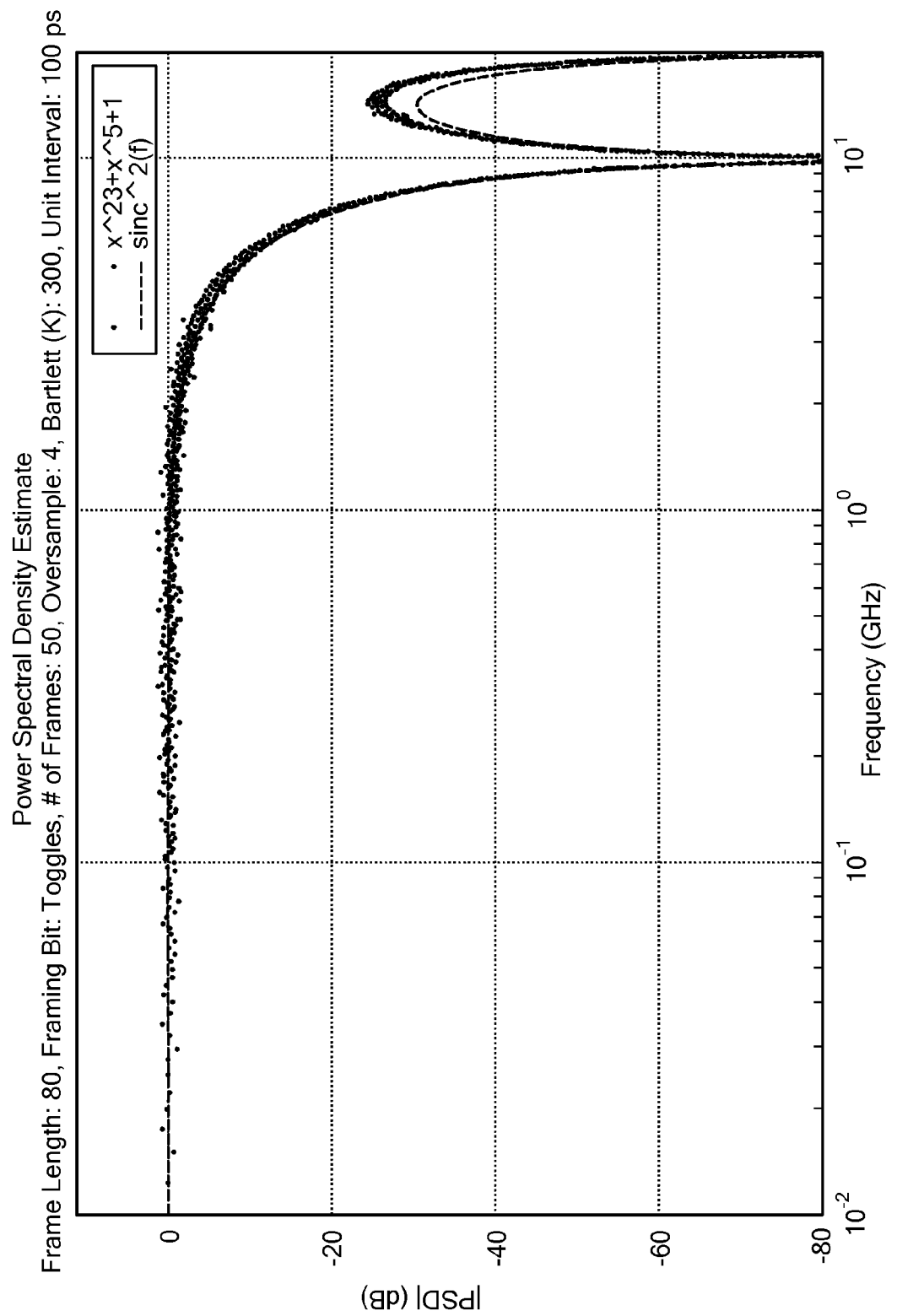

FIG. 6 shows the effect of an encoding scheme in which the bit stream is divided into 80-bit frames with a 79-bit scrambled payload and 1 unscrambled framing bit (80b79b). It is apparent that this encoding scheme results in a power-spectral density that is nearly identical to that of the pseudo-random bit sequence and that of the 39b40b encoding scheme of FIG. 5.

Figure 7:
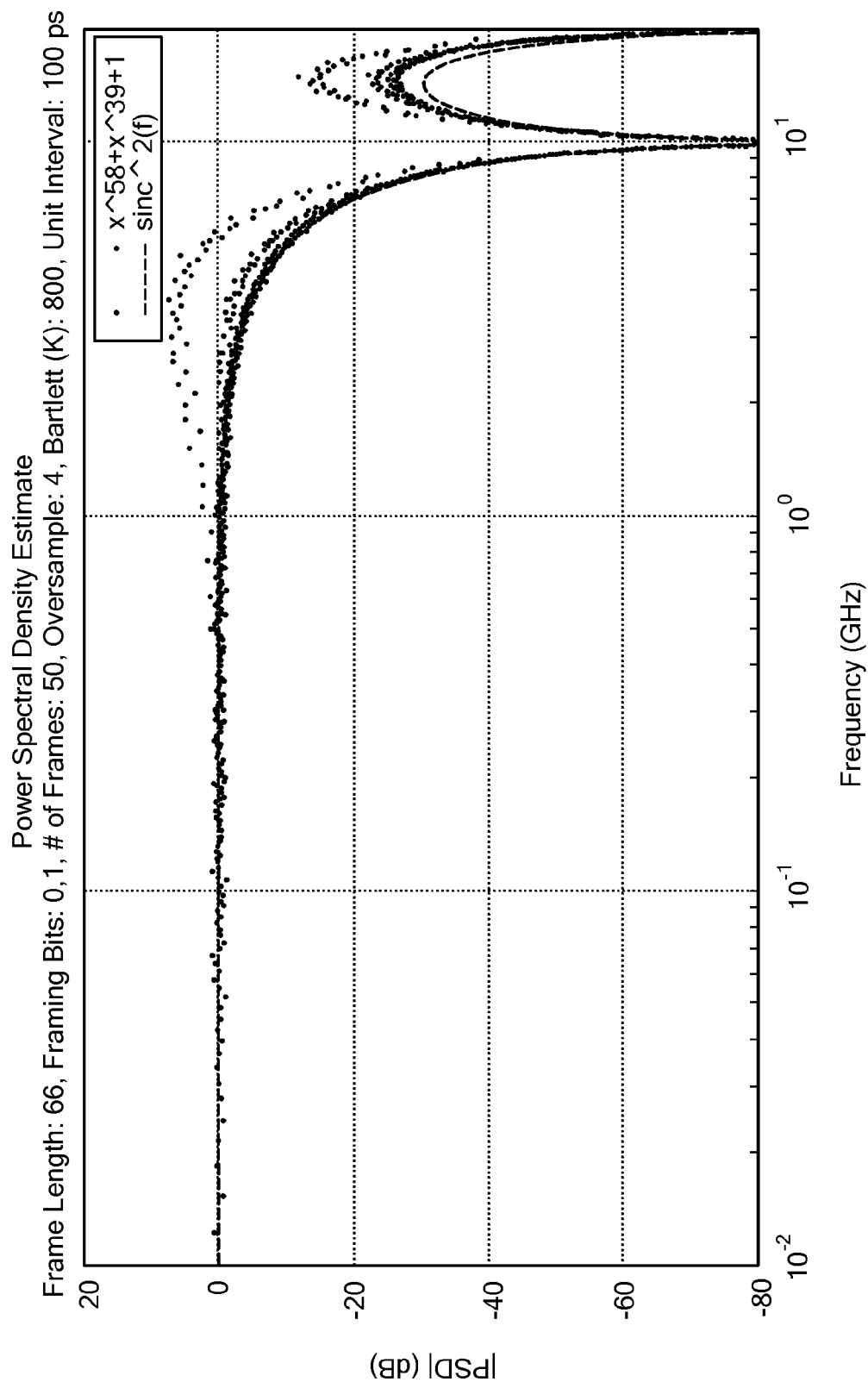

FIG. 7 shows the effect of an encoding scheme used in 10G Ethernet communication in which a "01" framing pattern defines a 66-bit frame with 64 payload bits. Again, the payload bits are scrambled but the framing bits are not. In this case, there are narrow frequency spikes caused by the framing bits. These spikes would cause distortion unless compensated for in some way. To compensate for these spikes, an adaptive equalizer circuit in the serializer/deserializer circuit would have to average across a frequency band wide enough render the effects of the spikes negligible.

Figure 8:
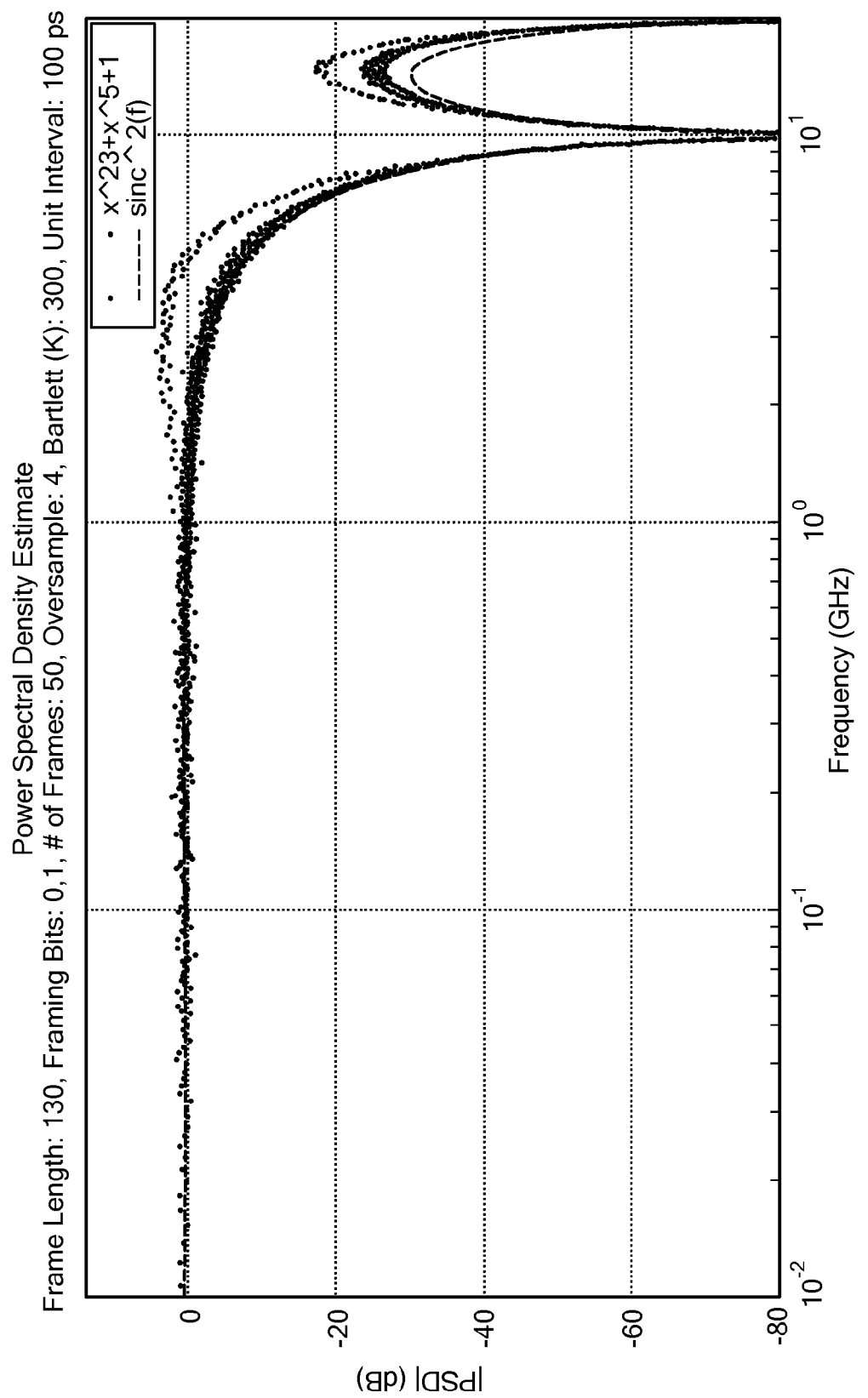

FIG. 8 shows the effect of an encoding scheme such as that used in the PCI Express Generation 3 ("PCIe Gen3"), which uses a "01" framing pattern appended after 128 bits of payload. In FIG. 8, the payload bits are scrambled but the framing bits are not. Like the encoding scheme shown in FIG. 7, that shown in FIG. 8 results in narrow spikes that would cause distortion unless compensated for.

Figure 9:
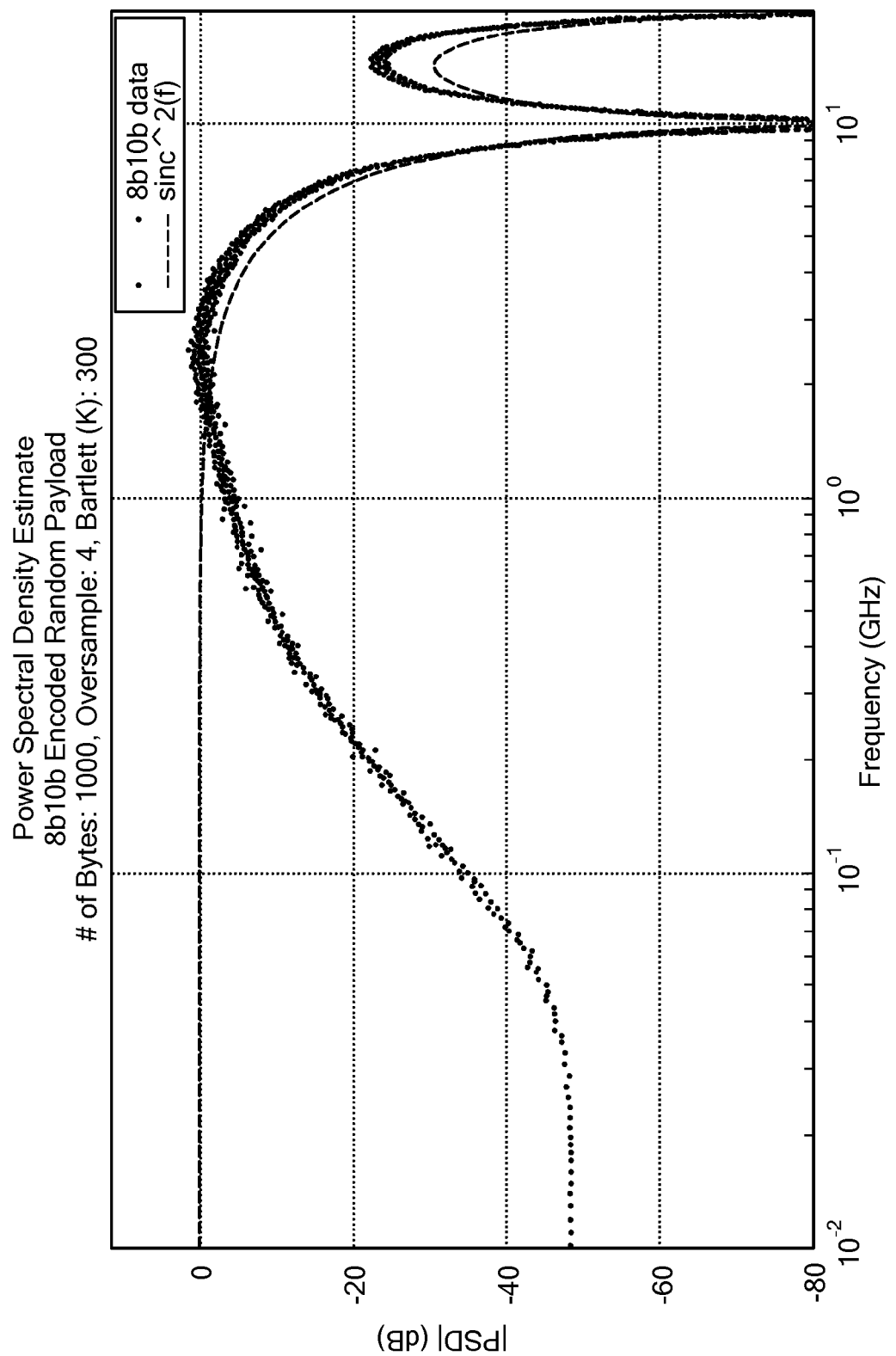

FIG. 9 shows the power spectral density of random data organized into 10-bit frames with an 8-bit payload. This coding is intended to provide sufficient transition density to simplify clock recovery. An adaptive linear equalizer could support both 8b10b encoding and 64b66b encoding by taking the ratio of a mid-frequency band and a high frequency band. However, the equalizer would need to know the particular encoding scheme used if a low frequency band were selected.

Figure 10:
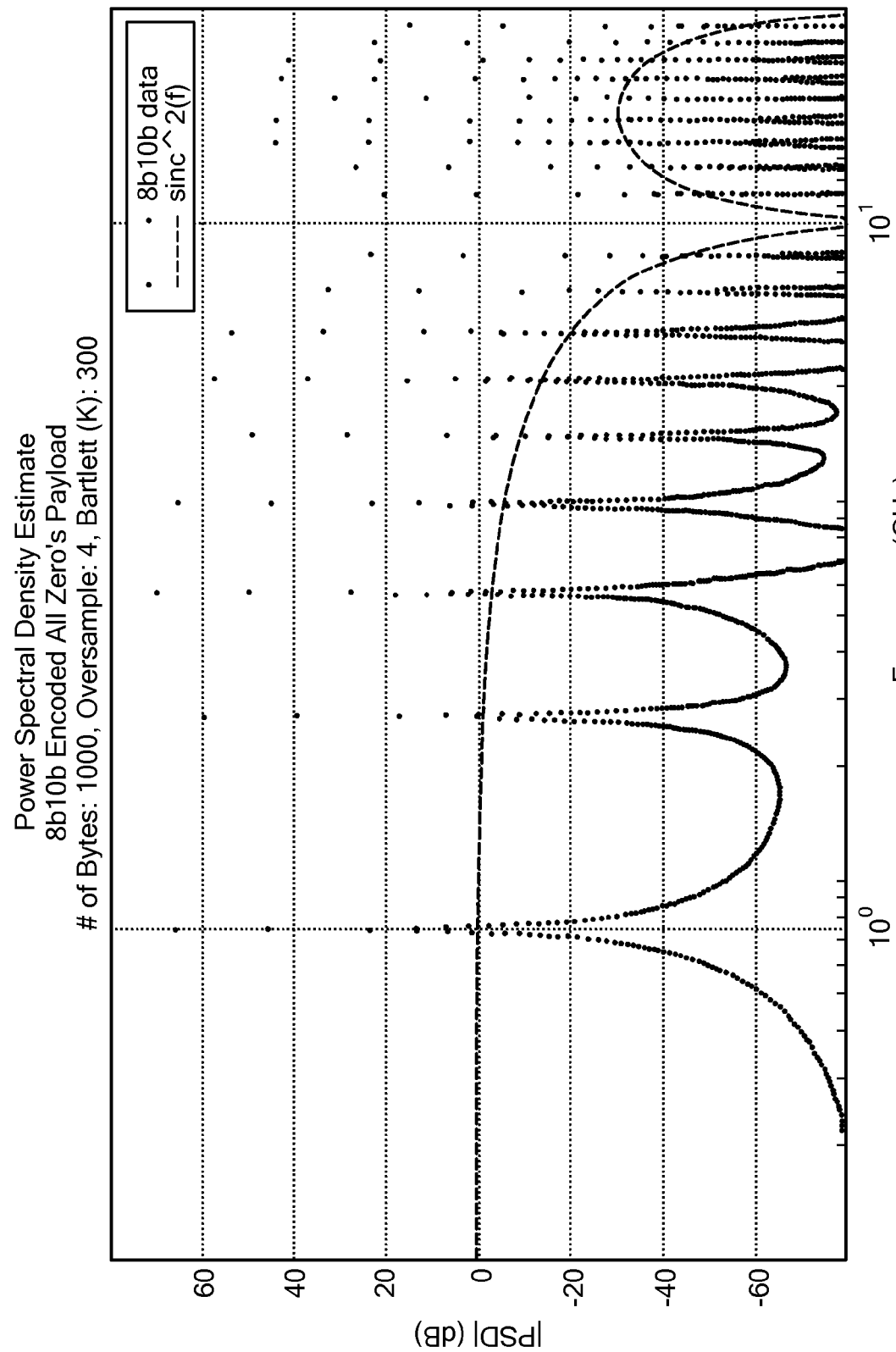

FIG. 10 shows the effect of failing to scramble the payload bits, as is the case in common 8b10b encoding scheme such as that used in 1 Gb/s Ethernet, Fibre Channel, and XAU1. As is apparent, repeated data patterns generate spikes in the power-spectral density. When an adaptive linear equalizer is used, these spikes cause considerable distortion, which in turn results in high bit error rates. As a result, when such an encoding scheme is used, it is preferable to rely on fixed, rather than adaptive, linear equalizers. While such fixed equalizers are appropriate for lower bandwidth protocols, at 10 Gb/s, electrical characteristics of channels 14 vary so widely at higher frequencies that such equalizers are unlikely to be close to optimal. As a result, it is preferable to always scramble payload data when 8b10b encoding is used at high bandwidths (i.e. on the order of 10 Gb/s or greater).

As noted above, a serializer/deserializer circuit benefits from receiving a bit stream that has been encoded in such a way as to limit the maximum number of consecutive bits in the same state. This limitation is referred to as a "run-length" limitation.

The existence of a run-length limitation causes the incoming signal to have fewer amplitude sags between transitions, thus avoiding the need for large blocking capacitors that would otherwise be needed to maintain the voltage level during the amplitude sags.

Run-length limitations also result in bit streams with high signal transition density. Such bit streams enable clock recovery and phase alignment circuits within the serializer/deserializer circuit to maintain better center phase alignment.

Finally, run-length limits reduce sample distortion. Adaptive linear equalizers and gain control circuits base their decisions on samples taken from the bit stream over fixed time intervals. As a result, they are susceptible to errors caused by transient low frequency peaks. Since extended runs tend to increase the low frequency content of an incoming bit stream, limiting run lengths reduces the likelihood that such transient low frequency peaks will occur. A table of maximum run lengths for a variety of encoding schemes is shown below. Although the run lengths for scrambled and random bits is unbounded, in practice, the mean time to a run in excess of 100 bits is long enough to be negligible.

| code | max run length (bits) |
| --- | --- |
| 8b10b | 5 |
| 39b40b | 40 |
| 79b80b | 80 |
| 64b66b | 66 |
| PCIe Gen 3 | 130 |
| Scrambled | unbounded |
| Random | unbounded |

Figure 11:
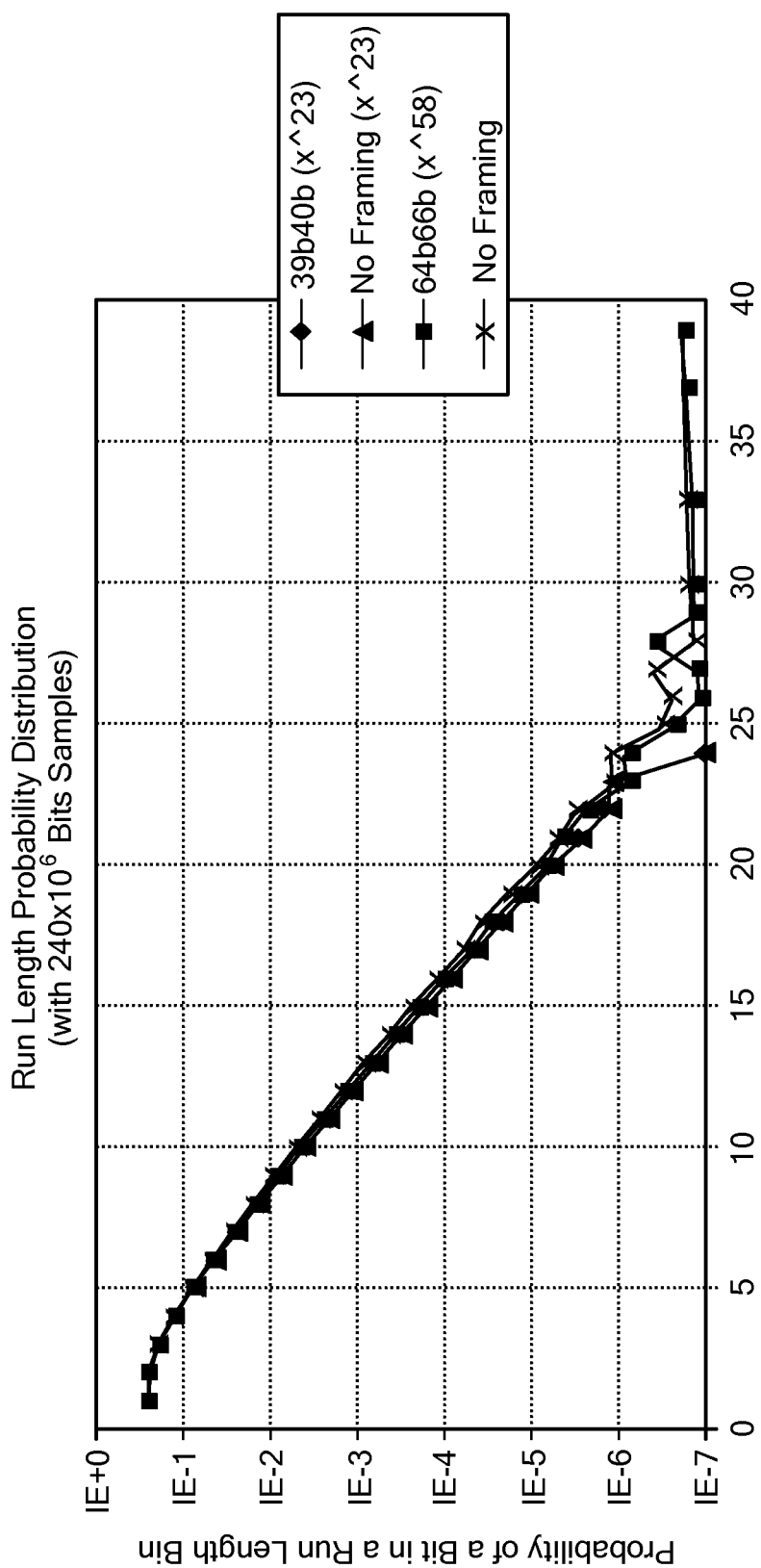
FIG. 11 shows the probability distribution of run lengths for each of several encoding schemes.

Although for each encoding scheme (except scrambled and random data) a limit exists on run length, it is useful to know how long the run length is actually expected to be. FIG. 11 shows the probability distribution of run lengths for 39b40b and 64b66b encoding, together with corresponding unframed versions of the same data. It is apparent from FIG. 11 that 39b40b encoding tends to have shorter run lengths, and is therefore a more benign choice than 64b66b encoding.

Another useful measure of the effectiveness of a particular encoding scheme at avoiding excessive run lengths is the running disparity. The running disparity is calculated by adding 1 to an accumulator for each 1-bit, and subtracting 1 from the accumulator for each 0-bit. Thus, to the extent 1-bits and 0-bits are equally likely to occur, the running disparity should average to zero.

A low running disparity, when divided by the number of bits in a sample, measures the DC balance for that sample. Near DC balance is particularly useful for enabling an automatic gain control circuit to determine a signal's amplitude, as well as to prevent bias offset in AC coupled channels 14.

Figure 12:
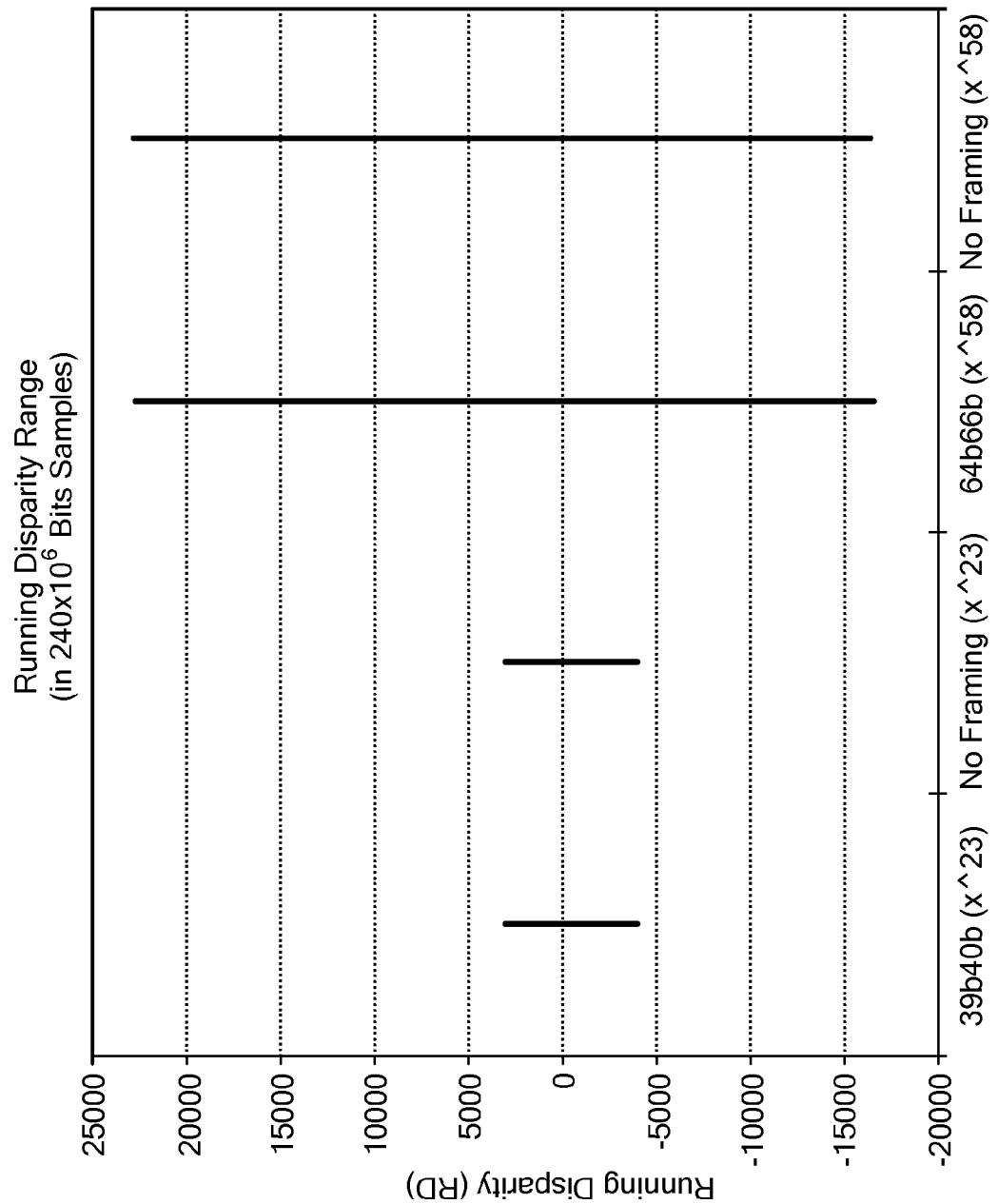
FIG. 12 shows running disparity for two encoding schemes.

FIG. 12 shows running disparity for two encoding schemes: 39b40b and 64b66b. It is apparent from inspection of the figure that the running disparity associated with 64b66b is much greater than that associated with 39b40b encoding. After dividing by the number of bits, the 39b40b encoding results in a DC imbalance of 16 ppm (parts per million) whereas the 64b66b encoding results in a DC imbalance of 95 ppm.

In view of their respective power spectral densities, maximum run lengths, run length probability distributions, and running disparity characteristics, it is apparent that 39b40b encoding more closely resembles random data than 64b66b encoding. Consequently, a serializer/deserializer circuit that uses 64b66b encoding will perform no worse than one that uses 39b40b encoding, while simultaneously providing lower latency and higher bandwidth than 64b66b encoding. An alternative to 39b40b encoding, which retains the single framing bit, is 79b80b encoding. The 79b80b encoding results in even higher bandwidth utilization than 39b40b encoding, but a more relaxed guarantee of maximum run length.

Figure 13:
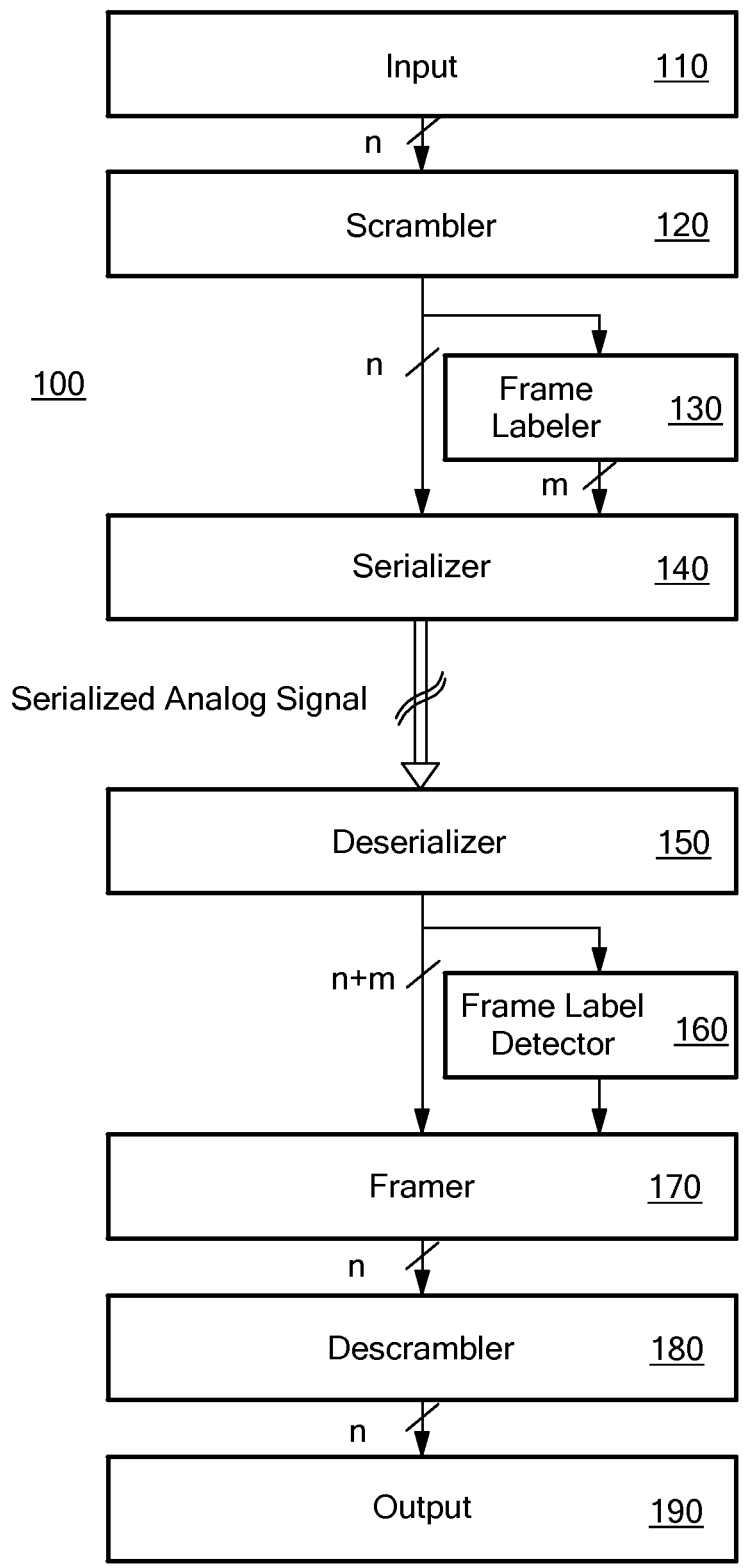
FIG. 13 shows a data communication system.

Referring to FIG. 13, a data communication system 100 includes a sending node and a receiving node coupled by a serial link. Binary data received at an input 110 of the sending node is processed in n-bit data units. These n bits will be referred to as "payload bits."

Because a run of zeros and ones adversely impacts communication, a scrambler 120 deterministically scrambles the n-bit data units are deterministically. As used herein, deterministic scrambling means that the outcome of the scrambling procedure can be determined from its input. This is in contrast to a probabilistic scrambling, in which the same input may result in different scrambled outputs. The scrambling procedure causes the resulting scrambled data units to have a statistically equal number of one bits and zero bits.

A frame labeler 130 then uses a subset of the bits from the scrambled data unit to generate an m-bit frame marker. The m bits that comprise the frame marker will be referred to as "framing bits." The n bits of scrambled data and the m-bit frame marker together form an (n+m)-bit frame.

A serializer serializes the frames and communicates them across a serial link to a deserializer 150. The deserializer 150 passes the serialized bits to a frame label detector 160. The frame label detector 160 identifies the m-bit frame markers that separate n-bit data units. The bits are also passed to a framer 170, which uses the location of the frame marker identified by the frame label detector 160 to recover each n-bit data unit. A descrambler 180 then reverses the deterministic scrambling to descramble each recovered n-bit data unit. The descrambled data unit is now equivalent to the source data received at input 110. An output 190 emits the descrambled binary data.

The input 110, scrambler 120, frame labeler 130, and serializer 140 are portions of a transmission system. The deserializer 150, frame label detector 160, framer 170, descrambler 180, and output 190 are part of a receiving system. In some embodiments, n is 39 and m is 1, forming a 40-bit frame for every 39-bit data unit. In some embodiments, n is 79.

In one embodiment, in which there is one framing bit (i.e. m is 1), the value of the framing bit is set by examining the value of a bit adjacent to the framing bit, and setting the framing bit to have the complementary value. As a result, the maximum run length cannot exceed the number of bits in the frame.

In another embodiment, in which there are m framing bits, the value of the framing bits might be obtained by taking the complement of the last m of the n payload bits and reversing their order.

It is to be understood that the foregoing description is intended to illustrate and not to limit the scope of the invention, which is defined by the scope of the appended claims. Other embodiments are within the scope of the following claims.

The invention claimed is:

1. A method for communicating binary data between a sending node and a receiving node said method comprising: avoiding synchronization loss when communicating binary data between said sending node and said receiving node, wherein avoiding synchronization loss comprises, at a sending node, accepting an n-bit data unit, deterministically scrambling the n bits of the accepted n-bit data unit, generating an m-bit frame marker having a value that is a function of the values of the bits in a subset of the scrambled bits, wherein generating the m-bit frame marker comprises generating a one-bit frame marker by inverting a predetermined one of the scrambled bits, grouping the frame marker and the scrambled bits into a data frame, and serially transmitting the data frame to the receiving node; and, at the receiving node, forming data frames from received bits according to the frame markers in the serially transmitted data; and for each formed data frame, recovering the scrambled bits for the data frame, descrambling the recovered bits to obtain the n-bit data unit accepted at the sending node.

2. The method of claim 1, wherein n is a number of bits in a range 39 to 79 inclusive.

3. The method of claim 1, wherein deterministically scrambling the n bits comprises applying an invertible transformation of the n bits such that the scrambled bits have a statistically equal number of one and zero bits.

4. The method of claim 3, wherein the formed data frames have statistically equal numbers of one bits and zero bits.

5. The method of claim 3, wherein the formed data frames have a power spectral density that approximates a sinc function.

6. The method of claim 1, wherein the m-bit frame markers are generated such that a maximum run length of equal bit values in the serially transmitted frames is less than or equal to n+m.

7. The method of claim 1, further comprising: transmitting a training data pattern from the sending node to the receiving node; and detecting frame timing at the receiving node according to the received training data pattern.

8. The method of claim 7, wherein forming data frames from received bits according to the frame markers in the serially transmitted data includes using the detected frame timing.

9. The method of claim 8, wherein forming data frames includes comparing received frame markers in the serially transmitted data with expected frame markers based on the detected frame timing.

10. The method of claim 7, further comprising initiating transmission of the training data pattern and detection of the frame timing when the received frame markers received in the serially transmitted data fail to match expected frame markers.

11. The method of claim 1, further comprising: at the sending node, receiving the n-bit data units at a physical coding sub-layer interface.

12. The method of claim 1, further comprising, at the sending node, for each of a series of (L·n)-bit data units, forming L separate n-bit data units, and for each of the L n-bit data units, deterministically scrambling the n bits of the accepted sequence of bits, generating an m-bit frame marker based on a subset of the scrambled bits, and forming a data frame by grouping the frame marker and the scrambled bits, and serially communicating each of the L formed data frames over a corresponding different serial communication link to the receiving node; and at the receiving node, for each of the different serial communication links, forming data frames from received bits according to the frame markers of frames transmitted on the serial communication link; and processing a formed frame from each of the serial communication links to form one of the (L·n)-bit data units.

13. The method of claim 12, further comprising: at the sending node, receiving the (L·n)-bit data units at a link layer interface.

14. A data processing system comprising a communication system, said communication system comprising: a sending node including an input section configured to receive a sequence of n-bit data units, a deterministic scrambler coupled to the input section, the scrambler being configured to accept an n-bit data unit from the input section and to produce a deterministically scrambled n-bit output, a frame labeler configured to generate an m-bit frame marker having a value that is a function of the values of bits in a subset of the deterministically scrambled n-bit output from the deterministic scrambler, wherein the m-bit frame marker comprises a one-bit frame marker generated by inverting a predetermined one of the scrambled bits, and an output section configured to provide a data frame formed by the frame marker and the scrambled bits to a serializer; and a receiving node including an input section configured to receive data frames from a deserializer, a frame detector coupled to the input section, the frame detector being configured to detect frames based on frame markers in the data frames from the deserializer, a framer coupled to the deserializer, the framer being configured to form n-bit outputs, a descrambler coupled to the framer for descrambling an n-bit data unit from the output of the frame, and an output section configured to providing a sequence of n-bit data units, whereby said data processing system avoids synchronization loss between said sending node and said receiving node.

15. A non-transitory computer-readable medium having encoded thereon software for causing a data processing system to avoid synchronization loss during communication of binary data between a sending node and a receiving node, said software comprising instructions for execution by a sending node and instructions for execution by a receiving node, wherein said instructions for execution by said sending node comprise instructions for: accepting an n-bit data unit, deterministically scrambling the n bits of the accepted n-bit data unit, generating an m-bit frame marker having a value that is a function of the values of bits in a subset of the scrambled bits, wherein said instructions for generating the m-bit frame marker comprise instructions for generating a one-bit frame marker by inverting a predetermined one of the scrambled bits, grouping the frame marker and the scrambled bits into a data frame, and serially transmitting the data frame to the receiving node; and wherein said instructions for execution at the receiving node comprise instructions for: forming data frames from received bits according to the frame markers in the serially transmitted data; and for each formed data frame, recovering the scrambled bits for the data frame, and descrambling the recovered bits to obtain the n-bit data unit accepted at the sending node, whereby synchronization loss between said sending node and said receiving node is avoided.

16. A method comprising avoiding synchronization loss while communicating binary data between a sending node and a receiving node, wherein avoiding synchronization loss while communicating binary data between a sending node and a receiving node comprises, at the sending node, accepting L·n bit data units, for each of the L·n bit data units, forming L separate n-bit data units, and for each of the L n-bit data units, deterministically scrambling the n bits of an accepted sequence of bits, generating an m-bit frame marker having a value that is a function of values of bits in a subset of the scrambled bits, wherein generating the m-bit frame marker comprises generating a one-bit frame marker by inverting a predetermined one of the scrambled bits and forming a data frame by grouping the frame marker and the scrambled bits, and serially communicating each of the L formed data frames over a corresponding different serial communication link to the receiving node; and at the receiving node, for each of the different serial communication links, forming data frames from received bits according to the frame markers of frames transmitted on the serial communication link; and processing a formed frame from each of the serial communication links to form one of the (L·n)-bit data units.

17. The method of claim 16, further comprising, at the sending node, receiving the (L·n)-bit data units at a link layer interface.

18. The method of claim 16, further comprising: transmitting a training data pattern from the sending node to the receiving node; and detecting frame timing at the receiving node according to the received training data pattern.

19. The method of claim 18, wherein forming data frames from received bits according to the frame markers in the serially transmitted data includes using the detected frame timing.

20. The method of claim 19, wherein forming data frames includes comparing received frame markers in the serially transmitted data with expected frame markers based on the detected frame timing.

21. The method of claim 18, further comprising initiating transmission of the training data pattern and detection of the frame timing when the received frame markers received in the serially transmitted data fail to match expected frame markers.

22. A method for data communication between a first and second node, said method comprising reducing loss of synchronization between a data signal and a clock signal, wherein reducing loss of synchronization between said data signal and said clock signal comprises selecting a power spectral density, and causing a power spectral density of said data signal to conform to said selected power spectral density, wherein causing said power spectral density to conform to said selected power spectral density comprises serially transmitting, from said first node to said second node, serially-transmitted data that comprises data frames, each of said data frames comprising grouped data elements, each of said grouped data elements comprising a first data element that comprises a first plurality of bits, said first plurality of bits having been formed by scrambling a second plurality of bits, and a second data element that comprises an arrangement of a third plurality of bits that marks said data frame, said third plurality of bits being a function of bits in said first plurality of bits, wherein said third plurality of bits comprises a bit obtained by inverting a predetermined bit from said first plurality of bits, and at said second node, receiving said serially-transmitted data and forming data frames using said second data elements in said serially-transmitted data, and, for each of said formed data frames, recovering a second plurality of bits associated with said formed data frame, wherein recovery of said second plurality of bits comprises descrambling of a first plurality of bits contained in said data frame.

* * * * *